United States Patent
Zeller et al.

(10) Patent No.: US 6,277,429 B1
(45) Date of Patent: Aug. 21, 2001

(54) SELF-WHITENING COFFEE AND METHOD OF MANUFACTURE THEREOF

(75) Inventors: Bary L. Zeller, Glenview, IL (US); William B. Graves, Stamford, CT (US); Raymond M. McGarvey, Middle Village, NY (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/659,945

(22) Filed: Sep. 12, 2000

Related U.S. Application Data

(62) Division of application No. 09/190,201, filed on Nov. 10, 1998, now Pat. No. 6,177,119.

(51) Int. Cl.[7] .................................................. A23F 5/00
(52) U.S. Cl. ........................... 426/594; 426/96; 426/569; 426/586
(58) Field of Search .............................. 426/594, 96, 569, 426/586

(56) References Cited

U.S. PATENT DOCUMENTS

| | | | |
|---|---|---|---|
| 2,398,081 | 7/1946 | Carter | 99/71 |
| 3,458,319 | 7/1969 | Block et al. | 99/71 |
| 3,653,911 | 4/1972 | Mancuso et al. | 99/71 |
| 3,706,572 | 12/1972 | Einstman et al. | 99/71 |
| 4,748,040 | 5/1988 | Kuypers | 426/569 |
| 5,128,156 | 7/1992 | McKenna et al. | 426/43 |
| 5,433,962 | 7/1995 | Stipp | 426/96 |
| 5,620,733 | 4/1997 | Chaveron et al. | 426/580 |

*Primary Examiner*—Anthony J. Weier
(74) *Attorney, Agent, or Firm*—Thomas A. Marcoux

(57) ABSTRACT

A self-whitening spray dried instant coffee is prepared by spray drying a caseinate-free aqueous emulsion having a pH of 5.5 to 9.0 and consisting essentially of 30–80% water and 20–70% solids, wherein the solids contain, on a dry weight basis, 10–70% soluble coffee, 5–60% oil, 0–85% filler, and 0–10% emulsifier.

6 Claims, No Drawings

SELF-WHITENING COFFEE AND METHOD OF MANUFACTURE THEREOF

This application is a divisional of application Ser. No. 09/190,201 filed on Nov. 10, 1998, now U.S. Pat. No. 6,177,119.

FIELD OF THE INVENTION

The present invention relates to spray dried self-whitening instant coffee compositions, to aqueous compositions for preparation thereof, and to methods of preparing the compositions.

BACKGROUND OF THE INVENTION

It is well known in the art to prepare instant coffee beverages from dry mix compositions which include a particulate soluble coffee component and a particulate "creamer" or whitener component. Such compositions also may contain a sweetener component and various optional components such as bulking agents, flavors, and coloring agents. Such compositions may be of the foaming type in which case the resulting beverage may be of the cappuccino type. Foaming may be caused by including a chemical carbonation system in the composition or by utilizing a low density (gas injected) creamer, or both. Coffee whiteners utilized in such compositions may be of the dairy or non-dairy type and typically include a fat ("oil") component, and a protein component which normally includes caseinate, a carbohydrate component.

One conventional method of preparing an instant coffee beverage composition involves dry blending of a particulate instant coffee and a particulate whitener. However, the whitener tends to separate from the coffee and the components may not dissolve at the same rate. Various techniques have been proposed to overcome these drawbacks. One such proposal is to agglomerate the whitener and instant coffee. Agglomeration processes are disclosed, for example, in U.S. Pat. Nos. 5,433,962; and 3,706,572.

It has also been proposed in U.S. Pat. No. 2,398,081 to wet-mix coffee and milk as a liquid concentrate which is dried to provide a homogeneous whitened instant coffee powder. A similar wet-mix method is disclosed in U.S. Pat. No. 5,620,733 in which milk or a milk derivative in concentrated form is mixed by wet methods with coffee followed by spray drying to form a whitened instant coffee.

A principal drawback associated with any instant coffee compositions containing caseinate or other lactic protein is that undesirable protein aggregates may appear in the reconstituted beverage. The '733 patent attempts to avoid this problem by heat treatment, both before and after concentration, in order to carry out a controlled flocculation of whey protein.

It is an object of the present invention to provide spray dried self whitening instant coffee that can be easily produced and which avoids the formation of protein aggregates in beverages prepared from the composition.

SUMMARY OF THE INVENTION

The foregoing and other objects which will be readily apparent to those having ordinary skill in the art are achieved in accordance with the present invention by providing:

an aqueous emulsion having a pH of from 5.5 to 9, and consisting essentially of 30–80% water, and 20–70% solids, wherein the solids contain, on a dry weight basis, 10–70% soluble coffee, a pH adjustment agent in an amount sufficient to effect said pH, 5–60% oil, 0–85% filler, and 0–10% low molecular weight emulsifier;

an improved method of spray drying an aqueous coffee extract composition to produce spray dried instant coffee wherein the aqueous coffee extract is the aqueous emulsion just described, whereby the spray dried coffee product is self-whitening;

a method of preparing the emulsion which comprises providing an aqueous composition having a pH of from 5.5 to 9 and consisting essentially of 30–80% water, and 20–70% solids, wherein the solids contain, on a dry weight basis, 10–70% soluble coffee, a pH adjustment agent in an amount sufficient to effect said pH, 5–60% oil, 0–85% filler, and 0–10% low molecular weight emulsifier;

subjecting said aqueous composition to high shear mixing to form an aqueous emulsion;

homogenizing said aqueous emulsion to form a homogenized aqueous emulsion; and spray drying said homogenized aqueous emulsion to form a self-whitening spray dried instant coffee;

a self-whitening spray dried instant coffee having an average particle size of 50 to 200 gm, and consisting essentially of 10–700 soluble coffee, 5–60% oil, 0–85% filler, and 0–10% low molecular weight emulsifier on a dry weight basis, including the oil; and a particulate dry mix instant cappuccino composition comprising the self-whitening spray dried instant coffee mentioned above and a chemical foam generating system comprising an acid and a carbonate or bicarbonate.

By "self-whitening instant coffee" is meant an instant coffee product which is whitened by emulsified oil to substantially the same extent of whitening that is achieved by whitening with a conventional dairy or non-dairy coffee creamer or whitener.

DESCRIPTION OF PREFERRED EMBODIMENTS

The present invention provides a particulate, self whitening spray dried instant coffee product which is prepared from an aqueous emulsion which contains, as essential ingredients, a soluble coffee component, a pH adjustment component, an oil component, a filler component and an optional low molecular weight emulsifier component. The instant coffee product is obtained by spray drying the emulsion containing the essential ingredients, and spray drying can be effected with equipment widely employed commercially in making spray dried coffee and coffee whiteners. The emulsion may be used as such to prepare a whitened coffee beverage in which case the filler component may be omitted. However, for preparing a spray dried product, a filler component is required to serve as a spray drying carrier to bind or encapsulate the oil component.

The soluble coffee component can be derived from any type of coffee beans such as Robustas and Arabicas. The coffee may be decaffeinated or caffeine-containing. The soluble coffee component is preferably provided as an aqueous extract, or percolate, of roasted and ground coffee or of thermally or acid-hydrolyzed spent coffee grounds, and the aqueous extract is preferably obtained in the same manner that such extracts are prepared for use in the commercial production of spray dried or freeze dried instant coffee. Alternatively, the soluble coffee component may be provided as a particulate instant coffee, such as spray dried or freeze dried coffee, in which case the coffee is dissolved in water in order to prepare the aqueous emulsion. The coffee component can be derived from a single coffee or a plurality of different coffees and may be obtained by a single extraction or from a plurality of separate extractions or from combinations of the foregoing.

The soluble coffee component is suitably present in the aqueous emulsion in an amount of from 10–70%, preferably 15–60%, and more preferably 30–45%. These percentages, and all percentages herein, are percentages by weight based on the dry weight of the relevant composition including the weight of the oil, unless stated to the contrary.

If the amount of coffee in the composition is at the high end of the range, then the resultant spray-dried product tends to have a medium brown color, whereas a composition containing a lesser amount of coffee will have a light brown color. Both, however, when reconstituted, provide a whitened coffee beverage.

In preparing the emulsion, it is preferred to first provide an aqueous solution of the soluble coffee component as an aqueous solution having a pH of 5.5 to 9, preferably 6 to 7.5, and more preferably 6.3 to 6.7. The desired pH is preferably accomplished by adding a pH adjustment agent to an aqueous solution of the soluble coffee component in an amount sufficient to effect the desired pH. Suitable pH adjustment agents include buffers, such as sodium and disodium phosphate, fumarate, tartrate and maleate, disodium and dipotassium phosphate, and trisodium and tripotassium citrate. A wide range of food grade buffers having different molecular weights, pKas and ionic charge densities are known and may be used. Alkaline materials such as sodium and potassium hydroxides, carbonates, and bicarbonates and calcium and magnesium hydroxides and carbonates may also be used and generally in a lesser amount than a buffer to achieve the same pH. Various combinations of buffers or alkaline materials or both may be employed and the term "pH adjustment agent" as used herein is intended to include such combinations.

There are a wide number of oils which are known to be useful in particulate, dry mix whiteners and any such oil can be employed as the oil component in the present invention. The oil component is preferably solid at room temperature and more preferably has a melting point in the range of 30–60° C. Vegetable oils are preferred. Suitable vegetable oils include soybean oil, canola oil, high-oleic sunflower oil or safflower oil. Various combinations of such oils may also be employed. Partially hydrogenated soybean oil having a melting point of from 30–50° C. is preferred. Dairy fats may also be employed. The term "oil" is intended to include oils which are solid at room temperature (i.e., fats) as well as those that are liquid at room temperature and is also intended to include combinations of such oils.

The oil component is suitably present in the aqueous emulsion in an amount of from 5–60%, preferably 15–50% and more preferably 25–40%. on a dry weight basis.

The filler component of the invention functions as a spray drying carrier or oil encapsulation agent and may also act as a bulking agent and/or sweetening agent. Any of the fillers useful in particulate spray dried whitener compositions may be employed. Among such fillers, non-dairy carbohydrates such as corn syrup solids and maltodextrins, are preferred. Other suitable fillers include modified starches, polydextrose, sweeteners such as sucrose, fructose, lactose, and maltose, and encapsulants such as gelatin and gum arabic. Various combinations of the fillers may be used and the term "filler" is intended to include such combinations.

The filler component may be omitted from the emulsion but, if present in the emulsion, is suitably present in the aqueous emulsion in an amount of up to 85%, preferably up to 60o on a dry weight basis, including the oil. More preferably, the filler is present in an amount of 10–40%. At sufficiently high levels of coffee, generally exceeding 30% by weight, based on the weight of the solids including the oil, the coffee can take the place of a filler since the coffee is itself a good spray drying carrier.

The self whitening creamer may also employ a low molecular weight emulsifier component such as mono- and di-glycerides, polysorbates, DATEM, sodium stearoyl lactylate, and calcium stearoyl lactylate, in order to enhance emulsification of the oil component. When present in the emulsion, the low molecular weight emulsifier is present in an amount of up to 10%, preferably 2–6%, and more preferably 3–5% on a dry weight basis, including the oil. It is an essential feature of the invention, however, that high molecular weight proteinaceous emulsion stabilizing agents, particularly caseinates, are not employed and are not required to form the present stable emulsions. We have surprisingly found that the protein functionality of the soluble coffee component apparently stabilizes the emulsion. This is surprising since it is widely known that coffee roasting causes denaturing of coffee protein. See, for example, *Coffee, Volume* 1:*Chemistry*, R. J. Clarke and R. Macrae, Eds., Elsevier Applied Science Publishers, New York, 1987, pp. 138–143.

The emulsion may be gas-injected prior to spray drying to impart foaming properties to the spray dried self whitening coffee product. Gas injection may be accomplished by conventional techniques such as those described in U.S. Pat. No. 4,438,147, U.S. Pat. No. 4,746,527, and U.S. Pat. No. 4,748,040. Gas injection reduces the density of the spray dried product, typically to provide a bulk density of about 0.1 to 0.3 g/cc. Without gas injection, the bulk density of the spray dried product is about 0.3 to 0.6 g/cc.

The average particle size of the spray dried product, either with or without gas injection, is suitably about 50 to 200 $\mu$m, and the maximum particle size is suitably about 3000 $\mu$m, and preferably about 1000 $\mu$m.

The self-whitening creamer may contain optional ingredients such as flavor and coloring components or other conventional components of self-whitening creamers provided that such components do not materially affect the basic and novel characteristics of the composition of the invention. For example, lactic protein, particularly caseinate, because it has a profound effect on emulsion formation and stability, is a conventional if not essential component of most known particulate whiteners, and is excluded from the present composition. Thus, the expression "consisting essentially of" as used herein is meant to exclude components, such as caseinate, which would materially affect the basic and novel characteristics of the present compositions. Moreover, lactic proteins which are excluded from the present composition have several negative effects which may include unsightly acid-or thermally-induced aggregation during production or beverage preparation, support of the growth of harmful bacteria such as salmonella and listeria, allergic reaction in sensitive individuals, and significantly increased finished product cost.

The water content of the emulsion is suitable 30–80%, preferably 35–65%, and more preferably 40–50%, the balance being solids. The term "solids" as used herein in connection with the emulsion is intended to include all of the ingredients of the emulsion, other than water, irrespective of whether the ingredient is solid at room temperature. These ingredients constitute the spray-dried product.

The emulsion is prepared by combining the ingredients to form an aqueous mixture, followed by high shear mixing/emulsification and homogenization, to produce an oil-in-water emulsion in which the mean oil droplet size is not more than 10 μm, preferably not more than 5 μm, and more preferably not more than 3 μm.

Preferably, the coffee component is provided as an aqueous coffee extract solution, and pH is adjusted to a target value within the ranges mentioned above prior to addition of the oil component. The aqueous solution preferably includes all of the water required for the emulsion. The oil component is preferably introduced in liquid form, such as by melting the oil component, and the aqueous solution is preferably heated to a temperature sufficient to maintain the oil in the liquid state. Filler and other optional ingredients may be added at any time but are preferably dissolved in the aqueous solution, which is preferably heated to facilitate dissolution of the filler, prior to introducing the oil component. For preparing a spray dried product, of course, the filler is required in order to serve as a spray drying carrier/oil encapsulator, except in formulas exceeding 30% coffee by weight based on the dry weight of the solids including oil.

After combining the ingredients, the liquid mixture is subjected to high shear mixing followed by homogenization to form the oil-in-water emulsion. High shear mixing is suitably carried out with a conventional high shear mixer at a shear rate of about 3000 to 30,000 sec$^{-1}$, preferably about 5000 to 15,000 sec$^1$. Homogenization is suitably carried out in conventional homogenizing equipment such as suitable for homogenizing milk. Homogenization is preferably carried out in a two stage homogenizer and under conditions which produce an oil-in-water emulsion in which the mean oil droplet size is not more than 10 μm, preferably not more than 5 μm, and more preferably not more than 3 μm.

The emulsion is then spray dried. Conventional equipment for spray drying coffee or whiteners may be employed. The emulsion is preferably heated to facilitate spray drying, preferably at temperatures suitable for spray drying of instant coffee. A temperature of about 60–90° C. is suitable.

Spray drying is preferably conducted under conditions such that the moisture content of the spray dried product is less than 5% and preferably less than 3%. On a dry basis, the content of the essential ingredients of the spray dried self whitening coffee is as follows:

| Component | Amount (wt %) | | |
| --- | --- | --- | --- |
| | Suitable | Preferred | More Preferred |
| Coffee | 10–70 | 15–60 | 30–45 |
| Oil | 5–60 | 15–50 | 25–40 |
| Filler | 0–85 | 0–60 | 10–40 |
| Emulsifier | 0–10 | 2–6 | 3–5 |

Of course the spray dried product would also include the pH adjustment component. The amount of the pH adjustment component that is present in the spray dried product would simply result from the amount thereof that was necessary to achieve the desired pH during preparation of the emulsion. The amount of ph adjustment component (e.g., buffer) would typically be from about 0.1 up to about 10% by weight based on the dry weight of the spray dried self whitening coffee, preferably about 0.2–6%, and more preferably 0.3–5%.

The spray dried self whitening instant coffee may be used as such to make a coffee beverage. It is preferred to employ the self whitening coffee in dry mix compositions for preparation of sweetened coffee beverages which may also include additional flavors such as hazelnut, vanilla, mocha, or the like. Such compositions usually are in the form of a mechanical mixture of a particulate soluble coffee component, a particulate whitener component, and a particulate sweetener component. The use of particulate whitener can be reduced or preferably eliminated from such dry mix compositions which contain the present self-whitening coffee. This can provide benefits such as dry mixes having a more uniform brown color, lower cost, higher density, or reduced package size. Another advantage is that the absence of lactic protein in the self-whitening coffee reduces its susceptibility to microbial growth and eliminates the need for salmonella testing which is a routine, lengthy, and costly regulatory requirement for ensuring the food safety of particulate whiteners. As mentioned above, a filler of the present invention can itself be a sweetener or may include a sweetener. Accordingly, where the filler is or includes a sweetener, the self whitening coffee of the present invention may be employed to replace some or all of such a mechanical mixture. It is a particular advantage that the self whitening coffee product of the present invention can be used with such sweetened coffee beverage compositions of the type that employ a dry mix chemical carbonation system to generate foam when the composition is dissolved in hot water. Such chemical carbonation systems rely on the interaction between a food grade acid, such as citric acid, and sodium or potassium carbonate or bicarbonate, to generate carbon dioxide upon dissolution of the composition in hot water. The carbon dioxide creates foam, producing a cappuccino type beverage. The acid component of such chemical carbonation system causes "feathering" of proteinaceous components such as caseinate. It is a particular advantage that the self whitening coffee of the present invention avoids such feathering when employed in dry mix instant cappuccino compositions which include such a chemical foam generating system.

The invention is further illustrated in the examples which follow.

EXAMPLE 1

Spray dried Robusta instant coffee powder (157 grams) and 374 grams of 24 DE corn syrup solids (CSS) are dissolved in 1000 g of 80° C. water. Disodium phosphate (DSP) (15 grams) is then added to increase the pH of the solution to 6.2. Partially hydrogenated soybean oil (PHSBO) (454 grams) having a melting point of 40° C. is melted and added to the solution. The solution is emulsified using a model# L4R Silverson high shear laboratory mixer/emulsifier with a fine screen attachment. The solution is mixed for 30 minutes at 8,000 rpm to form an oil-in-water emulsion. The emulsion is then homogenized using a model# 15MR-8TBA APV Gaulin two-stage homogenizer. The solution is passed through the homogenizer twice, with a first stage homogenization pressure of 2200 psi and a second stage homogenization pressure of 500 psi, to yield a mean oil droplet size of <5 microns. The solution is then spray dried using a model# LAB S1 W.O. 207 Anhydro spray dryer with a model# CD-63 rotary atomizer, operating at a speed of 20,000 rpm. The product collected from the spray dryer is free-flowing and has a moisture content of <2.0%. The final dry composition of the spray-dried powder is 15.7% coffee, 37.46 CSS, 45.4% PHSBO, and 1.5% DSP. The powder disperses quickly in hot water to provide a whitened coffee beverage with minimal surface oil.

"Minimal surface oil" means no more than 20 visible oil droplets on the surface of a beverage prepared by dissolving 6 grams of the self whitening coffee (SWC) in 8 oz. of 80° C. water. A beverage having a greater amount of surface oil may be judged to have an unappealing appearance and may also provide insufficient beverage whitening.

EXAMPLE 2

The procedure of Example 1 is followed using the same ingredients to prepare another spray dried instant self whitening coffee powder having a dry composition of 42.6% coffee, 15.4% CSS, 38.4% PHSBO, and 3.6% DSP. The product collected from the spray dryer is free-flowing and has a moisture content of <2.0%. The spray dried powder and reconstituted beverage have a significantly darker color and stronger coffee flavor than the reconstituted beverage of Example 1 due to the higher coffee to oil ratio, but the reconstituted beverage has the appearance of a whitened coffee beverage. No surface oil is present when the SWC is reconstituted in hot water.

EXAMPLE 3

130 grams of spray dried Arabica (Colombian) instant coffee powder and 398 g of 24 DE CSS are dissolved in 1000 g of 80° C. water. DSP is then added to increase the pH of the solution to 6.2 PHSBO having a melting point of 40° C. is melted and added to the solution. The solution is emulsified, homogenized, and spray dried under the same conditions as Example 1. The product collected from the spray dryer is free-flowing and has a moisture content of <2.0%. The final dry composition is 13.0% coffee, 39.8% CSS, 45.4% PHSBO, and 1.8% DSP. The powder disperses quickly in hot water to provide a whitened coffee beverage with minimal surface oil.

EXAMPLE 4

157 grams of spray dried Robusta instant coffee powder and 345 g of 24 DE CSS are dissolved in 1000 g of 80° C. water. DSP was then added to increase the pH of the solution to 6.2. PHSBO having a melting point of 40° C. and sodium stearoyl lactylate (SSL) were melted and added to the solution. The solution is emulsified, homogenized, and spray dried under the same conditions as Example 1. The product collected from the spray drier is free-flowing and has a moisture content of <2.0%. The final dry composition is 15.70 coffee, 34.5% CSS, 45.4% PHSBO, 3.1SSL, and 1.3% DSP. The powder disperses quickly in hot water to provide a whitened coffee beverage with minimal surface oil.

EXAMPLE 5

138 grams of spray dried Robusta instant coffee powder and 442 g of 24 DE CSS are dissolved in 1000 g of 80° C. water. DSP is then added to increase the pH of the solution to 6.2. PHSBO having a melting point of 40° C. is melted and added to the solution. The solution is emulsified, homogenized, and spray dried under the same conditions as Example 1. The product collected from the spray dryer is free-flowing and has a moisture content of <2.0%. The final dry composition is 13.8% coffee, 44.2% CSS, 35.0% PHSBO, 5.0% mono- and di-glycerides, and 2.0% DSP. The powder disperses quickly in hot water to provide a whitened coffee beverage with no surface oil.

EXAMPLE 6

680 grams of an aqueous Robusta coffee extract, having a solids content of 17%, and 374 g of 24 DE CSS are dissolved in 441 g of 80° C. water. DSP is then added to increase the pH of the solution to 6.2 PHSBO having a melting point of 40° C. is melted and added to the solution. The solution is emulsified, homogenized, and spray dried under the same conditions as Example 1. The product collected from the spray dryer is free-flowing and has a moisture content of <2.0%. The final dry composition is 12.1% coffee, 51.0% CSS, 35.0% HSBO, and 1.9% DSP. The powder disperses quickly in hot water to provide a whitened coffee beverage with minimal surface oil.

Control of oil droplet size and stability against coalescence is important in order to maintain the emulsion of the SWC of the invention during spray-drying and to obtain a high level of whitening upon reconstitution in water. Improved emulsification capacity reduces the amount of surface oil and increases the whitening obtained in the reconstituted beverage. As shown in the examples which follow, we have found that a combination of high-shear mixing and homogenization, along with adjustment of pH, provide optimal results.

EXAMPLE 7

Samples are prepared according to the procedure of Example 1 to identify the maximum amount of oil which may be encapsulated in the SWC without resulting in any surface oil in the reconstituted SWC beverage. The amount of water used is chosen to give finished SWC solutions containing 50% water. The solution is emulsified using a model # L4R Silverson laboratory high-shear mixer/emulsifier with a fine screen attachment. The solution is mixed for 20 minutes at 8,000 rpm in the Silverson high shear mixer to form an oil-in-water emulsion. The emulsion is then homogenized using the two-stage homogenizer. The solution is passed through the homogenizer twice, with a first stage homogenization pressure of 2200 psi and a second stage homogenization pressure of 500 psi, to yield a mean oil droplet size of <5 microns. The solution is then spray-dried using the Anhydro spray-dryer with rotary atomizer operating at a speed of 20,000 rpm. The product is free-flowing and has a moisture content of <2.0%.

The emulsification capacity of the coffee is determined by reconstituting 6 g of each spray-dried SWC powder in 8 oz. of 80° C. water. Some SWC beverages were free of surface oil, others had a small amount of surface oil, and others had a large amount of surface oil. The highest oil content which did not produce surface oil is identified for each coffee level and the results are as follows:

| Coffee (%) | DSP | Oil Levels Evaluated (%) | Emulsification Capacity |
| --- | --- | --- | --- |
| 15 | 1.5 | 5, 10, 15, 20, 25, 30, 35 | 20% oil |
| 30 | 3.4 | 10, 15, 20, 25, 30, 35, 40 | 25% oil |
| 45 | 5.0 | 15, 20, 25, 30, 35, 40 | 30% oil |

The emulsification capacity of the self-whitening coffee product can be increased by increasing the energy input during the emulsification process. By doubling the high-shear mix time, the emulsification capacity of the 30% coffee formulation is increased from 25% oil to 35 oil. This also increases the beverage whitening obtained in the reconstituted beverage.

EXAMPLE 8

Using the procedure of Example 7, a large number of solutions are prepared over a wide range of pH using disodium phosphate to control pH in order to identify the effect of pH on the emulsification characteristics of SWC solutions prepared at 50% solids concentration, employing the powder product of Example 1, in hot water. Results are as follows:

| pH Range | Mean Oil Droplet Size | Emulsion Stability | Flavor Impact | Overall Acceptability |
|---|---|---|---|---|
| 4.8–5.2 | <20 μm | very low | very low | poor |
| 5.3–5.7 | <15 μm | low | low | marginal |
| 5.8–6.2 | <10 μm | moderate | low | good |
| 6.3–6.7 | <5 μm | high | slight | very good |
| >6.7 | <5 μm | high | moderate | good |

It will be seen that higher pH produced smaller oil droplets which provide more stable emulsions with reduced surface oil and increased beverage whitening upon reconstitution of the spray-dried powders. Increasing the pH to an excessive degree can impart saltiness or alkalinity to the product and should be avoided for some product applications.

EXAMPLE 9

A SWC is formulated by dissolving 157 grams of spray-dried Robusta instant coffee powder and 374 g of 24 DE CSS in 1000 g of 80° C. water. 15 g of DSP is added to increase the pH of the solution to 6.2. 454 g of melted PHSBO is added and the solution is emulsified under the same conditions described in Example 7, except the mix time is increased from 20 to 40 minutes. The solution is spray-dried and the resulting powder is free-flowing and has a moisture content of <2.0%. The final dry composition of the powder is 15.7% coffee, 37.4% CSS, 45.4% PHSBO, and 1.5% DSP. The powder disperses quickly in hot water to provide a whitened coffee beverage with minimal surface oil. This result is similar to that of Example 1 in which minimal surface oil is present in reconstituted beverages made with SWC produced in the same manner with a 30 minute high shear mix. However, with a 20 minutes high shear mix as in Example 7, substantially less oil is emulsified.

EXAMPLE 10

This example demonstrates that use of a relatively large amount of coffee in the SWC formula can further improve the properties of the emulsion and provide an adequately whitened beverage having a strong coffee flavor. The procedure of Example 1 is followed to prepare a spray-dried powder having a dry composition of 42.6% coffee, 15.4% CSS, 38.46 PHSBO, and 3.6% DSP from a pH 6.2 solution. The product is free-flowing and has a moisture content of <2.0%. The reconstituted powder produces a beverage free of surface oil having a significantly darker cup color and stronger coffee flavor due to the higher coffee to oil ratio. Despite the high coffee level, the beverage has the appearance of a whitened coffee beverage.

Examples 11 and 12 demonstrate the utility of non-protein low molecular weight emulsifiers in improving SWC emulsification and reducing beverage surface oil.

EXAMPLE 11

Robusta instant coffee powder and 24 DE CSS are dissolved in 80° C. water. DSP is added to increase the pH of the solution to 6.2. PHSBO and sodium stearoyl lactylate (SSL) are melted and added to the solution. The solution is emulsified, homogenized, and spray-dried under the same conditions described in Example 1. The product is free-flowing and has a moisture content of <2.0%. The final dry composition is 15.7% coffee, 34.5% CSS, 45.4% PHSBO, 3.1% SSL, and 1.3% DSP. The powder disperses quickly in hot water to provide a whitened coffee beverage with minimal surface oil.

EXAMPLE 12

Robusta instant coffee powder and 24 DE CSS are dissolved in 80° C. water. DSP is then added to increase the pH of the solution to 6.2. PHSBO and mono- and di-glycerides are melted together and added to the solution. The solution is emulsified, homogenized, and spray-dried under the same conditions described in Example 1. The product is free-flowing and had a moisture content of <2.0%. The final dry composition is 13.8% coffee, 44.2% CSS, 35.0% PHSBO, 5.0% mono- and di-glycerides, and 2.0% DSP. The powder disperses quickly in hot water to provide a whitened coffee beverage with no surface oil.

EXAMPLE 13

This example demonstrates that the present SWC emulsions can be gasified prior to spray-drying to produce powders which release encapsulated gas to create a head of foam in reconstituted beverages. A SWC slurry containing 30% Robusta coffee, 30% HSBO, 3% DSP, and 37% CSS is injected with pressurized carbon dioxide gas and spray-dried. When the spray dried powder is reconstituted in hot water, a head of foam develops on the beverage. This demonstrates that the coffee still retains some degree of surface activity even after it is employed to form and stabilize an oil-in-water emulsion during high-shear mixing and homogenization.

EXAMPLE 14

This example demonstrates the unique compatibility of the present SWC products with chemical carbonation agents used to generate carbon dioxide gas to create a head of foam in a reconstituted beverage. 10 g of the spray-dried powder from Example 3 is dry-blended with 0.12 g citric acid, 0.38 g potassium bicarbonate, and 10 g sugar. The mixture is reconstituted in 80° C. water to produce a whitened cappuccino-type coffee beverage having a head of foam and having a clean beverage surface after dissipation of the foam.

The use of chemical carbonation agents in combination with conventional dairy or non-dairy creamers containing sodium caseinate results in formation of undesirable floating protein aggregates on the surface of the beverage after dissipation of the foam. As such, it should be clear that an added and unexpected benefit of the present invention is the provision of a means to avoid acid-denaturation of sodium caseinate in chemically-carbonated dry mix instant cappuccino beverage compositions.

Although the invention has been described in considerable detail with respect to preferred embodiments thereof, variations and modifications will be apparent to those skilled in the art without departing from the spirit and scope of the invention as set forth in the claims.

What is claimed is:

1. Self-whitening spray dried instant coffee having an average particle size of 50 to 200 μm, and consisting essentially of 10–70% soluble coffee, 5–60% oil, 0–85% filler, and 0–10% low molecular weight emulsifier on a dry weight basis including the oil.

2. Self-whitening instant coffee according to claim 1 consisting essentially of 15–60% coffee, 15–50% oil, 0–60% filler, and 2–6% low molecular weight emulsifier on a dry weight basis including the oil.

3. Self-whitening instant coffee according to claim 1 consisting essentially of 30–45% coffee, 25–40% oil, 10–40% filler, and 3–5% low molecular weight emulsifier on a dry weight basis including the oil.

4. Self-whitening instant coffee according to any one of claims 1, 2, or 3 wherein said oil comprises vegetable oil.

5. Self-whitening instant coffee according to claim 4 wherein said oil comprises partially hydrogenated soybean oil.

6. In a particulate, dry mix instant cappuccino composition comprising instant coffee, a whitener, and a chemical foam generating system the improvement wherein the composition comprises a chemical foam generating system and a self-whitening spray dried instant coffee having an average particle size of 50 to 200 µm, and consisting essentially of 10–70% soluble coffee, 5–60% oil, 0–85% filler, and 0–10% low molecular weight emulsifier on a dry weight basis including the oil.

* * * * *